United States Patent
Waitkus et al.

(10) Patent No.: US 6,916,574 B2
(45) Date of Patent: Jul. 12, 2005

(54) METHOD FOR FORMING A FUEL CELL ELECTRODE USING A RESOLE BINDER

(75) Inventors: Phillip A. Waitkus, Sheboygan, WI (US); Bohumir B. Lepeska, Sheboygan, WI (US); Theodore N. Morrison, Sheboygan, WI (US); Paschal A. Sciarra, Sheboygan, WI (US)

(73) Assignee: Plastics Engineering Company, Sheboygan, WI (US)

( * ) Notice: Subject to any disclaimer, the term of this patent is extended or adjusted under 35 U.S.C. 154(b) by 64 days.

(21) Appl. No.: 10/615,713

(22) Filed: Jul. 9, 2003

(65) Prior Publication Data
US 2004/0058801 A1 Mar. 25, 2004

Related U.S. Application Data

(60) Provisional application No. 60/394,681, filed on Jul. 9, 2002.

(51) Int. Cl.$^7$ .......................... H01M 4/86; H01M 4/88; B01J 21/18; B01J 23/40
(52) U.S. Cl. .................... 429/40; 502/101; 502/182; 502/185; 429/42
(58) Field of Search .................. 502/101, 182, 502/185; 429/40, 42

(56) References Cited

U.S. PATENT DOCUMENTS

| | | | |
|---|---|---|---|
| 4,506,028 A | | 3/1985 | Fukuda et al. |
| 4,626,569 A | * | 12/1986 | Waitkus et al. ............. 524/541 |
| 4,656,239 A | | 4/1987 | Waitkus et al. |
| 4,666,755 A | | 5/1987 | Shigeta et al. |
| 4,668,496 A | * | 5/1987 | Korb et al. ............. 423/445 R |
| 4,687,607 A | | 8/1987 | Shigeta et al. |
| 4,775,455 A | * | 10/1988 | Chandramouli et al. .... 204/294 |
| 4,814,307 A | | 3/1989 | Funabashi et al. |
| 5,864,003 A | * | 1/1999 | Qureshi et al. ............. 528/141 |
| 6,060,190 A | | 5/2000 | Campbell et al. |
| 6,503,652 B2 | * | 1/2003 | Reynolds et al. ............. 429/34 |
| 6,624,108 B1 | * | 9/2003 | Clark et al. ................. 502/182 |

* cited by examiner

*Primary Examiner*—Jerry Lorengo
*Assistant Examiner*—Patricia L. Hailey
(74) *Attorney, Agent, or Firm*—Quarles & Brady LLP

(57) ABSTRACT

A method for forming an electrode for a fuel cell is disclosed. The method comprises combining an electrically conductive material (e.g., graphite) and a solid grindable resole resin binder, the binder being essentially free of nitrogen and nitrogen-containing compounds, and consolidating the electrically conductive material and the binder to form the fuel cell electrode. The use of a solid, grindable, single stage, nitrogen-free resole resin binder serves to increase the operating life of the electrode. One example binder comprises the reaction product of bisphenol A and a molar excess of an aldehyde, such as formaldehyde.

20 Claims, No Drawings

METHOD FOR FORMING A FUEL CELL ELECTRODE USING A RESOLE BINDER

CROSS-REFERENCES TO RELATED APPLICATIONS

This application claims benefit from U.S. Provisional Patent Application No. 60/394,681 filed Jul. 9, 2002.

STATEMENT REGARDING FEDERALLY SPONSORED RESEARCH

Not Applicable.

BACKGROUND OF THE INVENTION

1. Field of the Invention

This invention relates to a method for forming an electrode for a fuel cell. More particularly, this invention relates to a method for forming an electrode for a fuel cell wherein the method uses a resole resin binder that serves to increase the operating life of the electrode.

2. Description of the Related Art

One power generation system that has attracted widespread recent interest in the automotive industry is the low temperature fuel cell. One type of low temperature fuel cell is the polymer electrolyte membrane fuel cell which comprises a polymeric electrolyte membrane sandwiched between two electrodes, i.e., an anode and a cathode. The fuel cell generates electrical power by bringing a fuel into contact with the anode and an oxidant into contact with the cathode. The fuel is typically a hydrogen-containing material (for example, water, methane, methanol or pure hydrogen), and may be supplied to the fuel cell in liquid form or gaseous form, such as hydrogen gas. The fuel is introduced at the anode where the fuel reacts electrochemically in the presence of a catalyst on the anode to produce electrons and protons in the anode. The electrons are circulated from the anode to the cathode through an electrical circuit connecting the anode and the cathode. Protons pass through the electrolyte membrane (which is an electron insulator and keeps the fuel and the oxidant separate) to the cathode. Simultaneously, an oxygen-containing oxidant, such as oxygen gas or air, is introduced to the cathode where the oxidant reacts electrochemically in the presence of a catalyst on the cathode consuming the electrons circulated through the electrical circuit and the protons at the cathode. The halfcell reactions at the anode and the cathode are, respectively: $H_2 \rightarrow 2H^+ + 2e^-$ and $\frac{1}{2}O_2 + 2H^+ + 2e^- \rightarrow H_2O$. The external electrical circuit withdraws electrical current and thus receives electrical power from the cell. The overall fuel cell reaction produces electrical energy which is the sum of the separate halfcell reactions written above.

Various processes are known for forming the fuel cell electrodes. For example, U.S. Pat. No. 4,506,028 discloses a process in which a mixture of carbon fibers, a resin binder such as a powdery phenol resin, and a granular pore regulator are press-molded and cured to form an electrode. U.S. Pat. Nos. 4,666,755 and 4,687,607 disclose processes in which a mixture of carbon fibers, a resin binder such as a phenol resin, and a granular pore regulator are press-molded over a support web and cured to form an electrode. U.S. Pat. No. 4,814,307 discloses a process in which a dry blend of carbon fibers, a phenol resin binder, and a granular pore regulator are extruded, press-molded and cured to form an electrode.

While the aforementioned processes for forming the fuel cell electrodes may be satisfactory, they do have certain disadvantages. For instance, these processes may use materials that produce a fuel cell electrode having less than optimal operating efficiency and life. Therefore, there is a need for a method for forming fuel cell electrodes wherein the method does not use materials that limit electrode operating efficiency or operating life.

SUMMARY OF THE INVENTION

The foregoing needs are met by a method for forming a fuel cell electrode according to the invention wherein the method does not use materials that limit electrode operating efficiency or operating life. Specifically, it has been discovered that the presence of nitrogen compounds in the materials used in electrode manufacture interferes with the application and longevity of electrodes.

In a method according to the invention, an electrically conductive material (e.g., graphite) and a solid grindable resole binder, which is essentially free of nitrogen and nitrogen-containing compounds, are mixed together to form a mixture, and the mixture is shaped into a sheet. The sheet is then heated to an elevated temperature above the softening temperature of the solid grindable resole binder, and held at the elevated temperature for a sufficient time period to consolidate the electrically conductive material and the resole binder to form the electrode. Optionally, pressure may be applied to the mixture when shaping the sheet, and/or pressure may be applied to the sheet during heating. An electrocatalyst may then be applied to the electrode. The electrode may then be incorporated into a fuel cell.

Therefore, it is an advantage of the present invention to provide a method for forming fuel cell electrodes wherein the method does not use materials that limit electrode operating efficiency or operating life.

It is another advantage of the present invention to provide a method for forming fuel cell electrodes wherein the method does not use materials including nitrogen or nitrogen-containing compounds that limit electrode operating efficiency or operating life.

It is still another advantage of the present invention to provide a method for forming fuel cell electrodes wherein the method uses a resole resin binder that is free from nitrogen and nitrogen-containing compounds.

These and other features, aspects, and advantages of the present invention will become better understood upon consideration of the following detailed description and appended claims.

DETAILED DESCRIPTION OF THE INVENTION

The present invention provides a method for forming a fuel cell electrode. The method comprises combining an electrically conductive material and a solid grindable resole binder, the binder being essentially free of nitrogen and nitrogen-containing compounds, and consolidating the electrically conductive material and the resole binder to form the fuel cell electrode. The use of a solid, grindable, nitrogen-free and nitrogen-containing compound-free resole resin binder serves to increase the operating life of the electrode.

The electrically conductive material may comprise crystalline carbon particles (e.g., graphite), amorphous carbon particles (e.g., carbon black), or mixtures thereof. The carbon particles may be in various physical forms including powders, flakes and fibers. Preferably, the electrically conductive material comprises graphite.

The choice of binder for use in the method of the invention is critical. Phenolic resins are particularly advantageous when used as a binder in the method of the invention. Specifically, phenolic resins thermoset to form a cross-linked structure with the high levels of dimensional, chemical and thermal stability required in fuel cell electrodes. However, all phenolic resins may not be suitable for use as a binder in the method of the invention. First, liquid phenolic resins are generally not preferred for use as the binder in the method of the invention as the molding steps of the method require a solid binder for ease of handling and processability. Second, the solid phenolic resin used in the method should be friable or grindable by conventional grinding, milling or pulverizing methods known in the art. This allows the binder to be ground to a particle size that is most suitable for molding into the electrode. Third, the phenolic resin must be essentially free of nitrogen and nitrogen-containing compounds. The term "essentially free of nitrogen and nitrogen-containing compounds" means that nitrogen and nitrogen-containing compounds are not present in the phenolic resin above the levels commonly associated with trace impurities in phenolic resins.

Normally, phenolic resins are cured with either hexamethylene-tetraamine or with single stage resins which supply the necessary formaldehyde functionality to cure the novolac. However, in the present invention, a single stage phenolic resin (i.e., a resole) that is solid and grindable as well as essentially free of nitrogen and nitrogen-containing compounds is required for optimal performance of the fuel cell electrode. This is not possible with conventional phenol/formaldehyde single stage resins as all single stage resins are liquids unless nitrogen bearing compounds such as amines and amides are added to the cook. These nitrogen bearing compounds serve to raise the glass transition temperature ($T_g$) to a point which renders the polymer grindable. However, as detailed above, the presence of these nitrogen compounds interferes with the application and longevity of the fuel cell electrodes. Therefore, it is critical that a solid, grindable resole resin that is essentially free of nitrogen and nitrogen-containing compounds be used in the method of the invention.

One example binder is a solid grindable single stage thermosetting resole resin which is essentially free of nitrogen and nitrogen-containing compounds and which comprises the reaction product of a bisphenol and a molar excess of an aldehyde. Preferably, the aldehyde is formaldehyde and the bisphenol comprises a material have the following formula I:

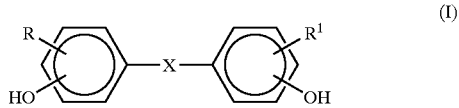
(I)

wherein R and $R^1$ are independently alkyl, aryl, arylalkyl or H, and X is a direct bond, sulfonyl, or alkylidene, wherein alkylidene is defined by the following Formula II:

(II)

wherein $R^2$ and $R^3$ are independently selected from H, alkyl, aryl, arylalkyl, halogenated alkyl, halogenated aryl and halogenated arylalkyl. Most preferably, the aldehyde is formaldehyde and the bisphenol is bisphenol A wherein R and $R^1$ are H, X is a alkylidene, and $R^2$ and $R^3$ are methyl. Preferably, the resole binder has a glass transition temperature of 104° F. or greater, a softening temperature between the range of 140° F. and 180° F., and a particle size between the range of about 25 to about 100 microns.

Another example binder is a solid grindable thermosetting single stage resole resin which is essentially free of nitrogen and nitrogen-containing compounds and which comprises the reaction product of (a) a mixture of (i) a bisphenol and (ii) a phenol or a substituted phenol such as cresol, and (b) a molar excess of an aldehyde (in relation to the total moles of phenolic compounds). Preferably, the aldehyde is formaldehyde, the bisphenol is bisphenol A as described above, and the phenol is phenol itself. Preferably, the molar ratio of bisphenol A to phenol is 0.1 to 1.7, and most preferably the molar ratio of bisphenol A to phenol is less than 2.0 to 1. This resole binder has a glass transition temperature of 104° F. or greater, a softening temperature between the range of 150° F. and 180° F., and a particle size between the range of about 25 to about 100 microns.

A specific example of the binder is a solid grindable thermosetting single stage bisphenol A resole resin which is essentially free of nitrogen and nitrogen-containing compounds and is commercially available from Rutgers-Plenco LLC, Sheboygan, Wis., USA under the designation Rutgers-Plenco 12780. This resole resin has a glass transition temperature of about 106° F., a softening temperature of about 167° F., and a particle size between the range of about 45 to about 75 microns.

An electrocatalyst may be applied to the electrode after consolidating the electrically conductive material and the resole binder. Non-limiting examples of electrocatalysts include platinum metal, palladium metal, rhodium metal, iridium metal, ruthenium metal, osmium metal, gold metal, platinum alloys, palladium alloys, rhodium alloys, iridium alloys, ruthenium alloys, osmium alloys, gold alloys, and mixtures thereof. The electrocatalyst is supported on the electrically conductive carbon particles.

Optionally, the electrically conductive material and the resole binder are applied to a support structure before consolidating the electrically conductive material and the resole binder. Non-limiting examples of suitable support structures include woven fabrics, non-woven fabrics, and meshes formed from materials such as carbon, metals, glass, and polymeric materials including polyolefins (e.g., polyethylene or polypropylene), nylon and polytetrafluoroethylene.

Fuel cell electrodes formed according to the present invention may then be placed on opposite sides of a commercially available polymeric electrolyte membrane to serve as the anode and the cathode of a polymer electrolyte fuel cell. The fuel cell can generate electrical power by bringing a fuel (e.g., hydrogen) into contact with the anode (which comprises a fuel cell electrode formed according to the invention) and an oxidant (e.g., oxygen) into contact with the cathode (which also comprises a fuel cell electrode formed according to the invention).

In one example method according to the invention, the electrically conductive material and the solid grindable resole binder (which is essentially free of nitrogen and nitrogen-containing compounds) are mixed together to form a mixture, and the mixture is shaped into a sheet. The sheet is then heated to an elevated temperature above the softening temperature of the solid grindable resole binder, and held at the elevated temperature for a sufficient time period to consolidate the electrically conductive material and the resole binder to form the electrode. Optionally, pressure may be applied to the mixture when shaping the sheet, and/or pressure may be applied to the sheet during heating. An electrocatalyst may then be applied to the electrode.

In another example method according to the invention, 70 wt. % to 90 wt. % of graphite particles and 10 wt. % to 30 wt. % of a solid grindable resole resin which is essentially free of nitrogen and nitrogen-containing compounds and which comprises the reaction product of a bisphenol and a molar excess of an aldehyde are mixed together to form a mixture, and the mixture is shaped into a sheet. The sheet is then heated to an elevated temperature above the softening temperature of the solid grindable resole binder, and held at the elevated temperature for a sufficient time period to consolidate the electrically conductive material and the resole binder to form the electrode. Optionally, pressure may be applied to the mixture when shaping the sheet, and/or pressure may be applied to the sheet during heating. An electrocatalyst may then be applied to the electrode.

In yet another example method according to the invention, 70 wt. % to 90 wt. % of graphite particles and 10 wt. % to 30 wt. % of a solid grindable bisphenol A resole resin commercially available from Rutgers-Plenco LLC, Sheboygan, Wis., USA under the designation Rutgers-Plenco 12780 are mixed together to form a mixture, and the mixture is shaped into a sheet 12 inches wide by 12 inches long by 0.10 inches thick. The sheet is then heated to 300° F., and held at 300° F. for 10 minutes to consolidate the graphite particles and the resole binder to form the electrode. Optionally, 1,000 psi to 15,000 psi of pressure may be applied to the mixture when shaping the sheet, and/or 1,000 psi to 15,000 psi of pressure may be applied to the sheet during heating. A platinum electrocatalyst may then be applied to the electrode.

Although the present invention has been described with reference to certain embodiments, the present invention can be practiced by other than the described embodiments, which have been presented for purposes of illustration and not of limitation. Therefore, the scope of the appended claims should not be limited to the description of the embodiments contained herein.

We claim:

1. A method for forming a fuel cell electrode, the method comprising:

combining an electrically conductive material and a solid grindable resole resin binder, the binder being essentially free of nitrogen and nitrogen-containing compounds; and consolidating the electrically conductive material and the binder to form the electrode.

2. The method of claim 1 wherein:

the binder comprises the reaction product of a bisphenol and a molar excess of an aldehyde.

3. The method of claim 2 wherein:

the bisphenol comprises a material have the following formula I:

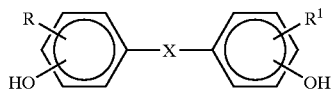

(I)

wherein R and R$^1$ are independently alkyl, aryl, arylalkyl or H, and X is a direct bond, sulfonyl, or alkylidene, wherein alkylidene is defined by the following Formula II:

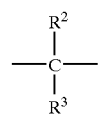

(II)

wherein R$^2$ and R$^3$ are independently selected from H, alkyl, aryl, arylalkyl, halogenated alkyl, halogenated aryl and halogenated arylalkyl.

4. The method of claim 3 wherein:

the bisphenol is bisphenol A wherein R and R$^1$ are H, X is a alkylidene, and R$^2$ and R$^3$ are methyl.

5. The method of claim 2 wherein:

the aldehyde is formaldehyde.

6. The method of claim 1 wherein:

the binder has a glass transition temperature of 104° F. or greater.

7. The method of claim 1 wherein:

the binder has a softening temperature between the range of 150° F. and 180° F.

8. The method of claim 1 wherein:

the binder has a particle size between the range of about 25 to about 100 microns.

9. The method of claim 1 wherein:

the electrically conductive material is selected from crystalline carbon particles, amorphous carbon particles, and mixtures thereof.

10. The method of claim 1 wherein:

the electrically conductive material comprises graphite.

11. The method of claim 1 wherein:

the electrically conductive material and the binder are applied to a support structure before consolidating the electrically conductive material and the binder.

12. The method of claim 1 further comprising:

applying an electrocatalyst to the electrode after consolidating the electrically conductive material and the binder.

13. The method of claim 12 wherein:

the electrocatalyst is selected from platinum metal, palladium metal, rhodium metal, iridium metal, ruthenium metal, osmium metal, gold metal, platinum alloys, palladium alloys, rhodium alloys, iridium alloys, ruthenium alloys, osmium alloys, gold alloys, and mixtures thereof.

14. The method of claim 1 wherein the step of consolidating the electrically conductive material and the binder to form the electrode comprises:

heating the electrically conductive material and the solid grindable resole resin binder to a temperature above the softening temperature of the solid grindable resole resin binder.

15. The method of claim 14 wherein the step of consolidating the electrically conductive material and the binder to form the electrode further comprises:

applying pressure to the electrically conductive material and the solid grindable resole resin binder.

16. The method of claim 1 wherein the step of combining the electrically conductive material and the solid grindable resole resin binder comprises:

mixing the electrically conductive material and the solid grindable resole resin binder to form a mixture, and shaping the mixture into a sheet.

17. The method of claim 1 wherein:

the resole resin binder comprises a single stage resin.

18. The method of claim 1 wherein:

the resole resin binder comprises the reaction product of a bisphenol, phenol, and a molar excess of an aldehyde in relation to the total moles of bisphenol and phenol.

19. A fuel cell comprising at least one fuel cell electrode formed by the method of claim 1.

20. A method for forming a fuel cell electrode, the method comprising:

combining an electrically conductive material and a solid grindable resole resin binder, the binder being essen tially free of nitrogen and nitrogen-containing compounds; and consolidating the electrically conductive material and the resole resin binder to form the electrode, wherein the binder comprises the reaction product of a bisphenol and a molar excess of an aldehyde, wherein the binder has a glass transition temperature of 104° F. or greater, wherein the binder has a softening temperature between the range of 150° F. and 180° F., and wherein the binder comprises a single stage resin.

* * * * *